J. E. JOHNSTON.
LIQUID LEVEL INDICATOR.
APPLICATION FILED MAR. 5, 1913.
1,072,122.
Patented Sept. 2, 1913.
2 SHEETS—SHEET 2.
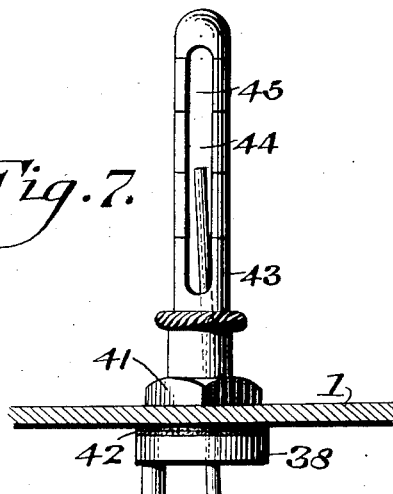
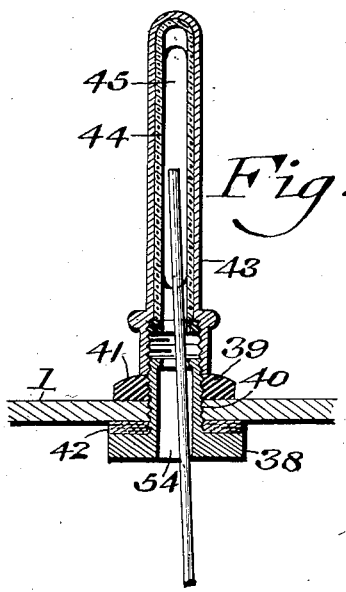
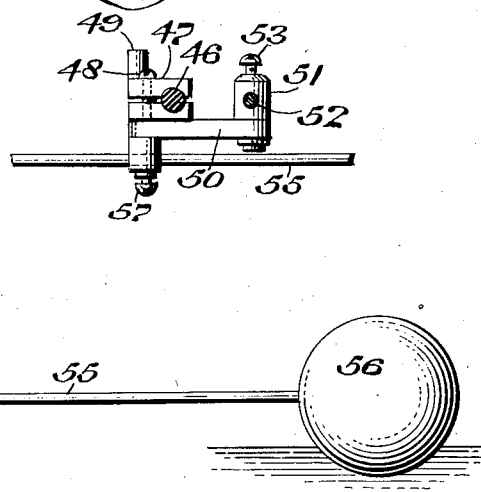
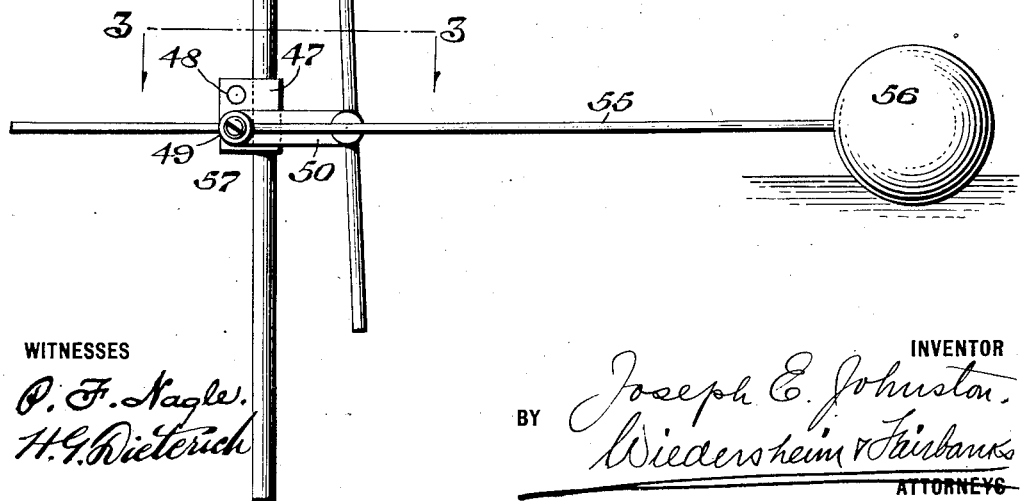
WITNESSES
O. F. Nagle.
H. G. Dieterich
INVENTOR
Joseph E. Johnston.
BY Wiedersheim & Fairbanks
ATTORNEYS

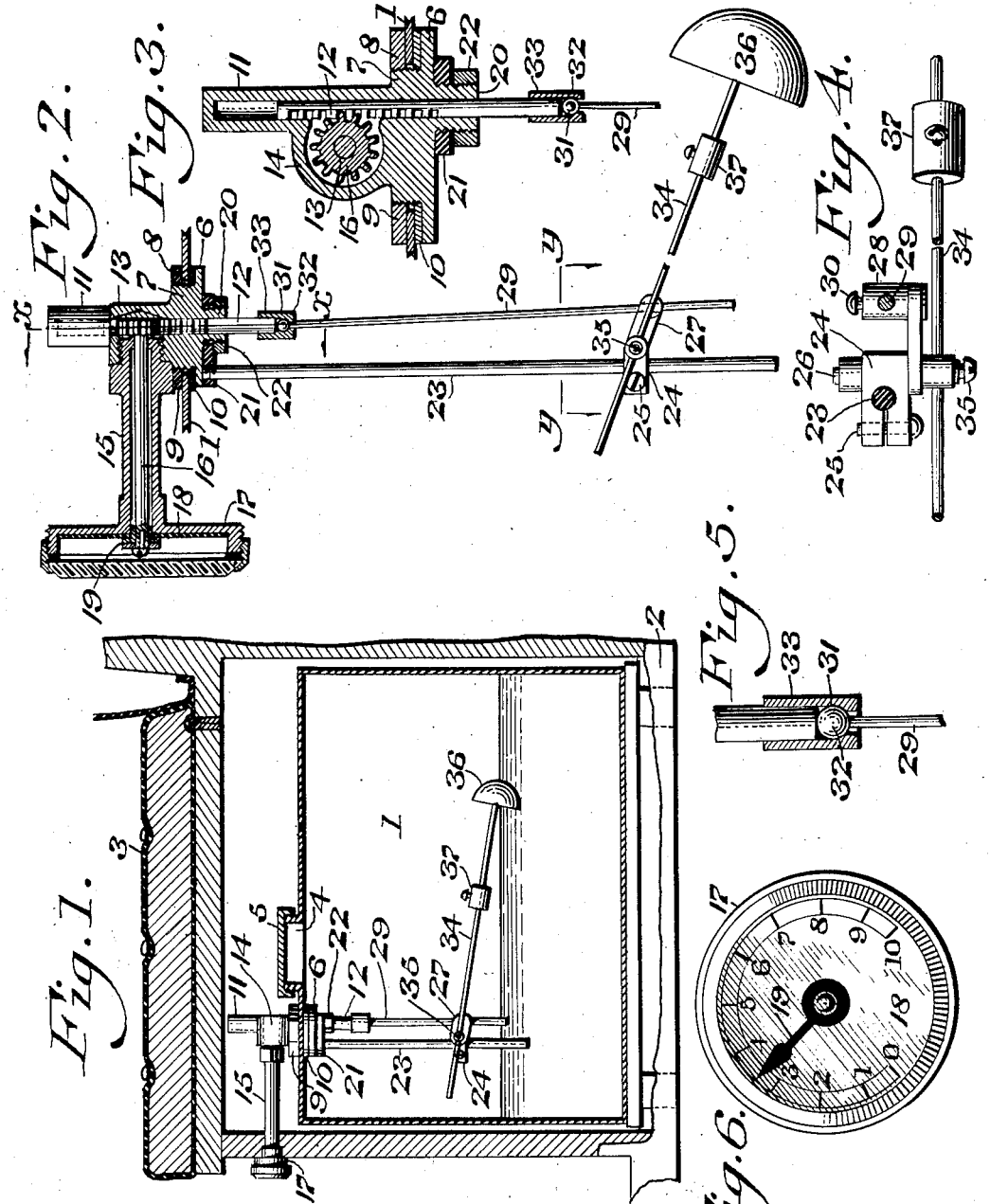
J. E. JOHNSTON.
LIQUID LEVEL INDICATOR.
APPLICATION FILED MAR. 5, 1913.
1,072,122.
Patented Sept. 2, 1913.
2 SHEETS—SHEET 1.

UNITED STATES PATENT OFFICE.

JOSEPH E. JOHNSTON, OF ARDMORE, PENNSYLVANIA.

LIQUID-LEVEL INDICATOR.

1,072,122.  Specification of Letters Patent.  Patented Sept. 2, 1913.

Application filed March 5, 1913. Serial No. 752,030.

*To all whom it may concern:*

Be it known that I, JOSEPH E. JOHNSTON, a citizen of the United States, residing at Ardmore, in the county of Montgomery, State of Pennsylvania, have invented a new and useful Liquid-Level Indicator, of which the following is a specification.

My invention consists of an improved liquid level gage which is particularly designed and adapted to ascertain the amount of gasolene in the fuel tank of an automobile or motor-boat, while it may be employed for ascertaining the liquid level in any tank or container.

It further consists of such a gage in which the actuating float may be moved and adjusted to suit the shape of the tank or container.

It further consists of improved means for supporting said gage in the tank or container.

It further consists of other novel features of construction, all as will be hereinafter fully set forth.

The annexed drawings and the following description set forth in detail one mechanical form embodying the invention, such detail construction being but one of various mechanical forms in which the principle of the invention may be used.

In said annexed drawings—Figure 1 represents a section through the seat of an automobile and a gasolene tank beneath the same, illustrating the application of my device. Fig. 2 represents a view, partly in section, of the detached device. Fig. 3 represents a section on the line *x—x* in Fig. 2. Fig. 4 represents a section on the line *y—y* in Fig. 2. Fig. 5 represents a sectional detail view of a part of the gage-actuating mechanism. Fig. 6 represents a view of the gage-dial and index. Fig. 7 represents a side elevation of another embodiment of my invention. Fig. 8 represents an axial section of the indicating portion of said device. Fig. 9 represents a section on the line *z—z* in Fig. 7.

Similar numerals of reference indicate corresponding parts in the figures.

Referring to the drawings, the reference numeral 1 indicates a liquid fuel tank for an automobile, supported upon the frame, 2, and beneath the seat, 3, of the same. The tank has the usual filling-opening, 4, in its top, closed by a cap, 5. A disk, 6, has a threaded portion, 7, which projects through an opening, 8, in the top of the tank, and upon which a nut, 9, fits to clamp against such top, and a washer, 10, is preferably interposed between the disk and the top to form a tight joint. A tubular guide, 11, extends upward from the threaded portion of the disk or support, and a rack-bar, 12, is guided in the same and meshes with a pinion, 13, within a housing, 14, upon the upper side of the support. A tubular bearing, 15, is screwed into one side of said housing, and a shaft, 16, is journaled in said bearing and has the pinion secured to one end. A casing, 17, is secured upon the outer end of the tubular bearing, and has a transparent cover and a dial-face, 18, and an index, 19, is secured to the outer end of the shaft and points to the figures upon the dial, said elements forming an indicating device. An externally screw-threaded neck, 20, projects from the under side of the disk in alinement with the tubular guide, having the rack-bar sliding through it, and an arm, 21, is secured upon said neck by a nut, 22. A rod, 23, has its upper end secured in the end of said arm, and a block, 24, is adjustably secured upon said rod by means of a clamping-screw, 25. A shaft, 26, is journaled in said block, and has an arm, 27, which carries a stud, 28, at its outer end, through which an index-rod, 29, is adjustably secured by a set-screw, 30. The upper end of said rod has a ball, 31, which is seated in a ball-seat, 32, of a socket, 33, secured upon the lower end of the rack-bar. A lever, 34, is slidable through a transverse bore in one end of the rock-shaft 26, and is secured in the same by a set-screw 35, axially threaded through the end of the rock-shaft, and a float, 36, is secured upon one end of said lever. A weight, 37, is adjustably slidable upon said lever. The tubular bearing extends through the front of the seat-support and the dial is exposed for inspection by a person sitting upon the seat.

To place the device in the tank, the bearing for the index-shaft is unscrewed and removed and the nut unscrewed from the threaded portion of the support, whereupon the device is inserted through the filling-opening of the tank and the tubular guide and the threaded part of the support inserted from beneath, up through the opening for it in the top of the tank, whereupon the nut is screwed in place, securing the device. The bearing is now passed through the front of the seat and screwed in place in the housing, with the pinion upon the index-shaft meshing with the rack-bar. The arm which carries the supporting-rod for the float-lever may be turned upon the threaded neck of the support to allow the float-lever to project into that part of the tank where it will have the most room to play, whereupon the arm is secured by the nut upon the threaded neck. The fulcrum-block 24 is now adjusted upon the supporting-rod to be at an equal distance from the top and the bottom of the tank. The stud 28 and its set-screw admits of adjustment of the stud-connection with the rack-bar rod according to the adjustment of the fulcrum-block. The length of the float-lever is adjusted by moving it in the fulcrum-shaft and securing it by the set-screw through the end of said shaft. The weight upon the float-lever may be adjusted according to the weight of the float and its buoyancy. The ball and socket or universal joint for the rack-bar and its rod, admits of the arm, with support rod and fulcrum block being adjusted all around to have the float lever project in any direction according to the dimensions of the tank.

The float will rise and fall with the level of the gasolene and will raise and lower the rack-bar to rotate the index-shaft and thus indicate the gasolene-level in the tank.

In Figs. 7, 8 and 9 is illustrated another embodiment of my invention, illustrating the indicator adapted for application to an exposed tank.

A disk, 38, has a screw-threaded neck, 39, which projects through an opening, 40, in the top of the tank, upon which fits a nut, 41, bearing against such top. A washer, 42, is placed between the disk and the inner side of the top of the tank to form a tight joint at the opening. A metallic thimble, 43, is screwed upon the upper end of the threaded neck and has a tube, 44, of glass or similar transparent material secured within it, which tube is visible through longitudinal slots, 45, in the thimble, so forming an indicating device. A supporting-rod, 46, is secured at its upper end in the disk, and a clamping-block, 47, is adjustably secured upon said rod by a clamping-screw, 48. A shaft, 49, is transversely supported to rock in said block and has an arm, 50, projecting from it, in the outer end of which a stud, 51, is pivoted, through which stud an index-rod, 52, is adjustably secured by a set-screw, 53. Said rod extends upward and passes through a central bore, 54, in the disk and threaded neck and into the glass-tube, where it is visible through the latter and the slots in the thimble. A float-lever, 55, having a float, 56, at one end, is slidable through the rock-shaft and is secured in its adjusted position by a set-screw, 57, through the end of the shaft.

When the disk, thimble and gage-glass are secured in the top of the tank, the clamping-block or fulcrum-block is adjusted and secured upon the supporting-rod at a point midway between the highest and the lowest liquid-level in the tank, and the index-rod is adjusted to have its upper end at the middle of the gage-glass when the float-lever is in horizontal position. Rise and fall of the liquid level in the tank will raise and lower the float and through its lever and the arm upon the rock-shaft raise and lower the rod in the gage-glass, where such rise and fall can be observed.

As the disk which supports this device in the top of the tank can be turned in the opening in said top and secured by the nut, the device may be adjusted to have the float-lever project in any desired direction, according to the shape of the tank or possible obstructions in the same, and minor adjustments may be made by turning the fulcrum-block upon the supporting-rod and clamping it.

Both forms of the device are adaptable to a number of different sizes and shapes of tanks.

Other modes of applying the principle of my invention may be employed for the mode herein explained. Change may therefore be made as regards the mechanism thus disclosed, provided the principles of construction set forth respectively in the following claims are employed.

Having thus described my invention, what I claim as new and desire to secure by Letters Patent, is:—

1. In a device of the character stated, a support adapted to be secured in an opening in the top of a tank, a supporting rod depending from said support, a fulcrum-block longitudinally adjustable upon such rod, a float-lever having a float and fulcrumed upon said block, an indicating device mounted upon the support, and an index-rod adjustably and pivotally connected to said lever and movably connected to said indicating device.

2. In a device of the character stated, a support adapted to be secured in an opening in the top of a tank, an indicating device mounted upon said support, a supporting-rod depending from said support and adapted to have its axis revolved around a fixed point of the support, a fulcrum-block upon said rod, a float-lever having a float and fulcrumed upon said block, and an index-rod having pivotal connection with said lever and movably connected to said indicating device.

3. In a device of the character stated, a support adapted to be secured in an opening in the top of a tank, an indicating device mounted upon said support, an arm pivoted upon the under side of said support, a supporting rod depending from said arm, a fulcrum-block upon said rod, a float-lever having a float and fulcrumed upon said block, an index-rod movably connected to the indicating device, and pivotal connection-means between said rod and lever.

4. In a device of the character stated, a support adapted to be secured in an opening in the top of a tank, an indicating device mounted upon said support, an arm pivoted upon the under side of said support, means for securing said arm in adjusted position, a supporting rod depending from said arm, a fulcrum-block adjustably secured upon said rod, a float-lever having a float and fulcrumed upon said block, an index-rod movably connected to the indicating device, and pivotal connection-means between said rod and lever and adjustable upon the former.

5. In a device of the character stated, a support adapted to be secured in an opening in the top of a tank and provided with a guide, an indicator having a shaft carrying a pinion, a rack-bar guided in said guide and engaging said pinion, an arm pivoted upon the under side of said support concentric with said guide and having means for securing it in adjusted position, a supporting rod projecting downward from said arm, a float-lever having a float and fulcrumed upon said rod, and a rod having a universal joint-connection with the rack-bar and pivotal connection to said float-lever.

6. In a device of the character stated, a support adapted to be secured in an opening in the top of a tank and formed with a tubular guide and a housing at the side of said guide and having a threaded neck upon its under side in alinement with the guide, a tubular bearing having one end secured in said housing and having a dial-casing at its other end, a shaft in said bearing and having an index at one end and a pinion at its other end within the housing, a rack-bar in said guide and meshing with said pinion, an arm pivoted upon the neck of the support, a nut upon said neck clamping said arm, a supporting rod extending from said arm, a fulcrum-block adjustable upon said rod, a shaft rocking in said block and having an arm, a rod adjustably and pivotally connected to said arm and having universal joint-connection with the rack-bar, and a float-lever adjustable in said rock-shaft and carrying a float.

7. In a device of the character stated, a support adapted to be secured in an opening in the top of a tank, a supporting rod depending from said support, a fulcrum-block longitudinally adjustable upon such rod, a float-lever having a float and fulcrumed upon said block, an indicating device mounted upon the support, and an index-rod adjustably and pivotally connected to said lever and movable with respect to said indicating device.

JOSEPH E. JOHNSTON.

Witnesses:
E. HAYWARD FAIRBANKS,
C. D. McVAY.